(12) United States Patent
Li et al.

(10) Patent No.: US 11,082,883 B2
(45) Date of Patent: Aug. 3, 2021

(54) PROVIDING PASSIVE BANDWIDTH ESTIMATION OF A WIRELESS LINK IN A TRANSMISSION CONTROL PROTOCOL (TCP) SLOW START STATE

(71) Applicant: Verizon Patent and Licensing Inc., Arlington, VA (US)

(72) Inventors: Feng Li, Lexington, MA (US); Haim S. Ner, Fair Lawn, NJ (US); Chunyan Du, Bedford, MA (US); Manian Krishnamoorthy, Derry, NH (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 50 days.

(21) Appl. No.: 16/227,837

(22) Filed: Dec. 20, 2018

(65) Prior Publication Data
US 2020/0205026 A1  Jun. 25, 2020

(51) Int. Cl.
*H04W 28/02* (2009.01)
*H04W 24/08* (2009.01)
*H04W 28/10* (2009.01)

(52) U.S. Cl.
CPC ....... *H04W 28/0273* (2013.01); *H04W 24/08* (2013.01); *H04W 28/0231* (2013.01); *H04W 28/0284* (2013.01); *H04W 28/0289* (2013.01); *H04W 28/10* (2013.01)

(58) Field of Classification Search
CPC . H04L 43/0829; H04L 43/0864; H04L 43/16; H04L 47/27; H04L 69/16
See application file for complete search history.

(56) References Cited

U.S. PATENT DOCUMENTS

| 2014/0105035 | A1* | 4/2014 | Lam | H04W 28/22 370/252 |
| 2015/0195210 | A1* | 7/2015 | Tsuruoka | H04L 1/188 370/235 |
| 2017/0331753 | A1* | 11/2017 | Li | H04L 47/27 |
| 2017/0339711 | A1* | 11/2017 | Belghoul | H04W 72/1268 |
| 2017/0366650 | A1* | 12/2017 | Zhu | H04L 47/27 |
| 2018/0227801 | A1* | 8/2018 | Dudda | H04W 28/08 |

OTHER PUBLICATIONS

R. S. Prasad et al., "Bandwidth estimation: metrics, measurement techniques, and tools", https://www.cc.gatech.edu/fac/Constantinos.Dovrolis/Papers/NetDov0248.pdf, Apr. 13, 2016, 12 pages.

\* cited by examiner

*Primary Examiner* — Mansour Oveissi (57) ABSTRACT

A device establishes a wireless link with a user device via a network and selects a time period for a slow start state of the wireless link. The device enters the slow start state after selecting the time period and repeatedly provides a quantity of packets over consecutive time periods to the user device. The device determines a delivery rate for each time period, of the consecutive time periods, based on the quantity of packets provided each time period and determines a maximum delivery rate for the delivery rates of the consecutive time periods. The device determines that the wireless link is at a maximum capacity when a current delivery rate satisfies a threshold rate, based on the maximum delivery rate, after a threshold time period of the consecutive time periods and exits the slow start state based on the wireless link being at the maximum capacity.

20 Claims, 11 Drawing Sheets

PROVIDING PASSIVE BANDWIDTH ESTIMATION OF A WIRELESS LINK IN A TRANSMISSION CONTROL PROTOCOL (TCP) SLOW START STATE

BACKGROUND

Transmission control protocol (TCP) slow start is a technique that balances a speed of a network connection, such as a link between a server device and a user device (e.g., a user equipment or UE) provided in a third generation (3G) network, a fourth generation (4G) or long-term evolution (LTE) network, a fifth generation (5G) network, and/or the like. A primary function of a slow start technique is to detect a maximum available bandwidth (e.g., a maximum capacity) for the link and/or to estimate a link capacity at current network conditions.

DETAILED DESCRIPTION OF PREFERRED EMBODIMENTS

The following detailed description of example implementations refers to the accompanying drawings. The same reference numbers in different drawings can identify the same or similar elements.

The slow start technique causes an amount of data transmitted on the link to gradually increase until the maximum available bandwidth (e.g., the maximum capacity) for the link is satisfied. During the slow start technique, growth of a congestion window (e.g., a TCP state variable that limits a quantity of data that can be sent into a network before receiving an acknowledgment message) for the link can be aggressive. For example, a congestion window size can double every round-trip time, and the congestion window size and/or a transmission rate can be increased by the slow start technique until any of the following three conditions becomes true: (1) a loss is detected, (2) the congestion window size satisfies an advertised window size of a user device, and/or (3) the congestion window size is greater than or equal to a slow start threshold.

However, none of the three above conditions works well over a noisy wireless link. For example, the current slow start technique often results in underestimating link capacity over wireless links because, when occasional wireless loss occurs (e.g., due to interference), a TCP sender device mistakenly treats the wireless loss as congestion loss and mistakenly attempts to reduce a load on the network. Therefore, it is not unusual for a TCP flow to prematurely exit from a slow start state due to occasional wireless loss.

Furthermore, the advertised window size of a user device is much larger in modern user devices (e.g., smartphones). The advertised window size can be even larger than a buffer size inside a network device (e.g., a router) of the network. Thus, before the congestion window size satisfies the advertised window size, the slow start technique triggers "buffer bloat" (e.g., a cause of high latency in networks due to excess buffering of packets) in network devices.

Finally, since a wireless link condition varies with time, the capacity of the wireless link also varies with time. Thus, it is impractical to have a universal slow start threshold for all TCP flows. For example, a TCP flow provided to a user device in a strong signal area should have a greater slow start threshold than a TCP flow provided to a user device in a weak signal area. Although a current slow start threshold is selected based on a per flow condition, the slow start threshold is set when link loss occurs. However, since the TCP sender device cannot differentiate occasional wireless loss from loss triggered by congestion, the slow start threshold selection is conservative and leads to under-utilization of wireless link capacity.

Some implementations described herein provide a device that provides passive bandwidth estimation of a wireless link in a transmission control protocol (TCP) slow start state. For example, the device can establish a wireless link with a user device via a network and can select a time period for a slow start state of the wireless link. The device can enter the slow start state of the wireless link after selecting the time period and can repeatedly provide a quantity of packets over consecutive time periods to the user device. The device can determine a delivery rate for each time period, of the consecutive time periods, based on the quantity of packets provided each time period and can determine a maximum delivery rate for the delivery rates of the consecutive time periods. The device can determine that the wireless link is at a maximum capacity when a current delivery rate satisfies a threshold rate, based on the maximum delivery rate, after a threshold time period of the consecutive time periods, and can exit the slow start state of the wireless link based on the wireless link being at the maximum capacity.

In this way, unlike existing bandwidth estimation techniques (e.g., the current slow start technique), implementations described herein provide a passive approach that does not require end-to-end control of a wireless link or control over a user device. The implementations described herein are deployed on a server device that utilizes user data to perform bandwidth estimation without introducing active measurement traffic (e.g., like existing bandwidth estimation techniques). The implementations described herein conserve resources (e.g., processing resources, memory resources, and/or the like) that would otherwise be wasted in attempting to balance a speed of a wireless link, detect a maximum available bandwidth for the wireless link, and/or estimate link capacity for the wireless link at current network conditions.

Figure 1A:
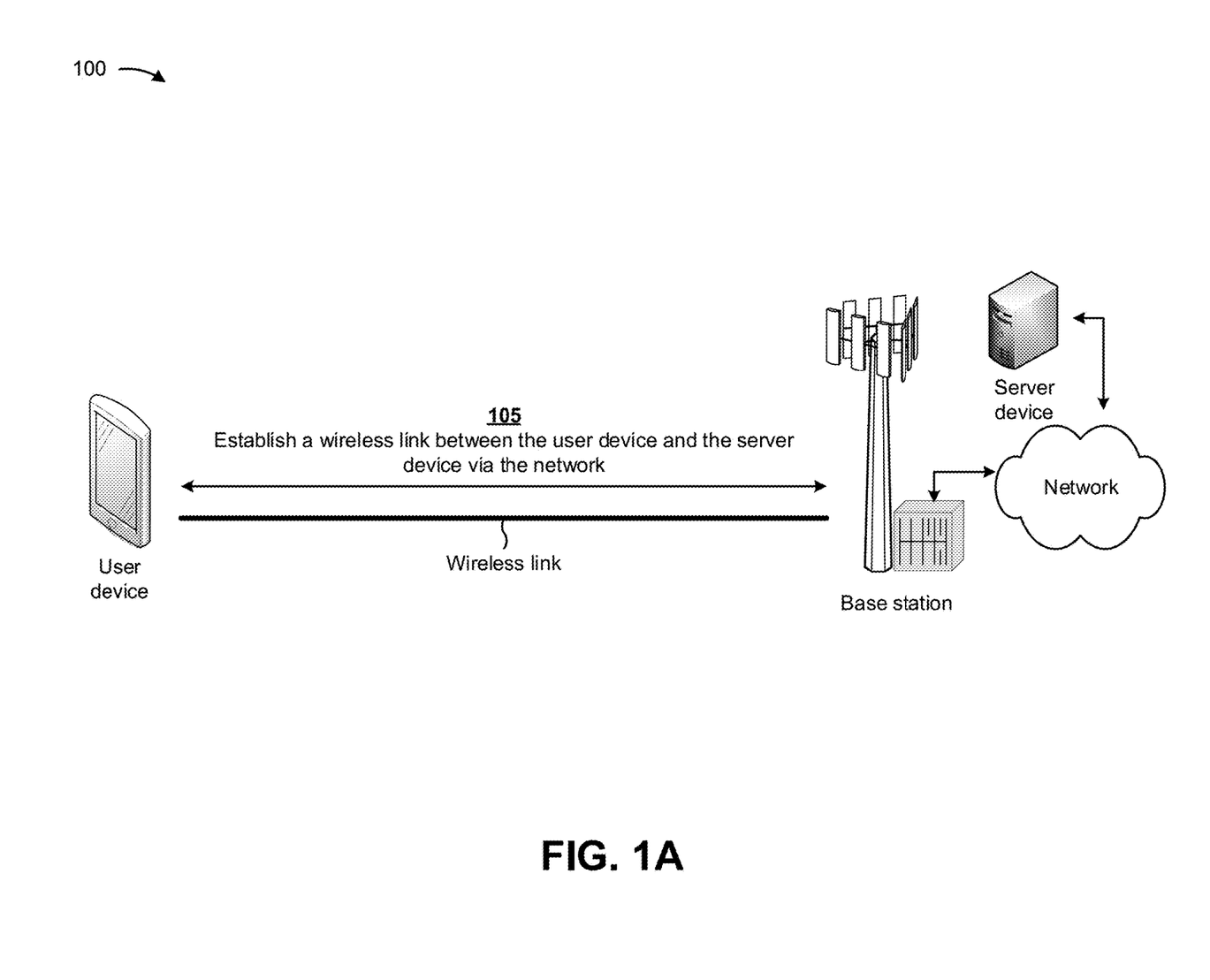
FIGS. 1A-1H are diagrams of an example implementation described herein.

FIGS. 1A-1H are diagrams of an example implementation 100 described herein. As shown in FIG. 1A, a user device can attempt to access a base station and an associated network and server device. As further shown in FIG. 1A, and by reference number 105, the user device can establish a wireless link (e.g., a radio resource control (RRC) connection) between the user device and the server device, via the base station of the network. In some implementations, the base station can broadcast a signal that includes a network indication. In such implementations, the user device can receive the signal and can establish the wireless link with the server device (e.g., via the base station) based on receiving the signal. In some implementations, the user device can be a TCP receiver device and the server device can be a TCP sender device.

Figure 1B:
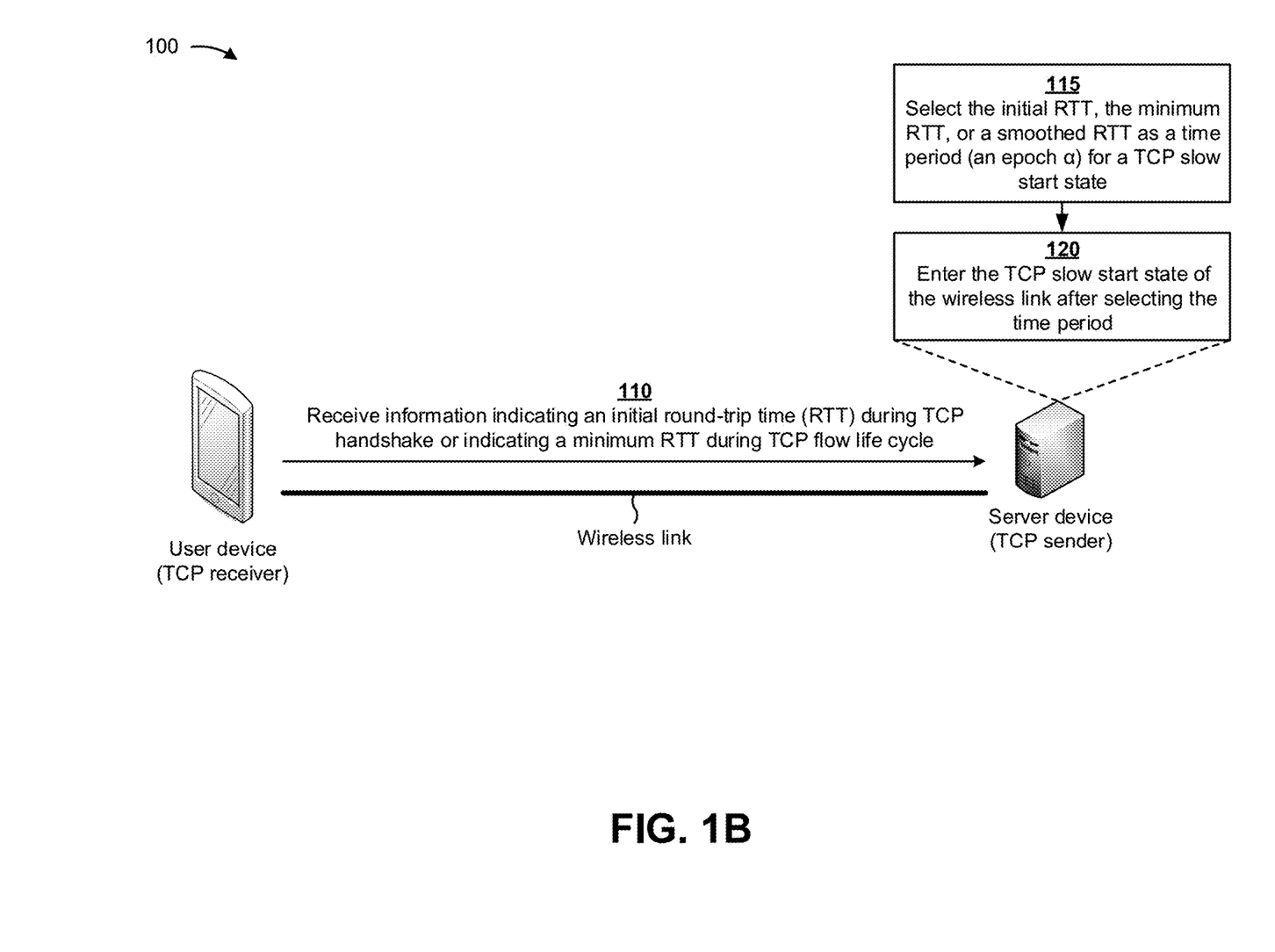

As shown in FIG. 1B, and by reference number 110, the server device can receive information indicating an initial round-trip time (RTT) during a TCP handshake between the user device and the server device and/or information indicating a minimum RTT during a TCP flow life cycle between the user device and the server device. In some implementations, the initial RTT can include a round-trip time that is determined based on the TCP three-way handshake. The three-way handshake can include the user device providing, to the server device, a message indicating that the user device wishes to establish a connection; the server device responding to the user device with an acknowledgment message; and the user device acknowledging the response of the server device. In some implementations, the packets exchanged during the three-way handshake are small and travel through the wireless link at a maximum speed of the wireless link. In some implementations, the minimum RTT can include a minimum time elapsed for an outgoing TCP packet from the server device to be answered by the user device.

As further shown in FIG. 1B, and by reference number 115, the server device can select one of the initial RTT, the minimum RTT, or a smoothed RTT as a time period (e.g., an epoch a) for a TCP slow start state. In some implementations, the smoothed RTT can be generated by applying a smoothing factor to the RTT of the wireless link, which creates a predicted round-trip time that assures packet delivery. In some implementations, the server device can select a small value for the time period, such as a value that is approximately equal to a round-trip latency between the server device and the user device (e.g., the TCP end points).

As further shown in FIG. 1B, and by reference number 120, the server device can enter the TCP slow start state of the wireless link after selecting the time period. In some implementations, entering the TCP slow start state of the wireless link can include beginning a TCP slow start technique as described below in connection with FIGS. 1C-1H.

Figure 1C:
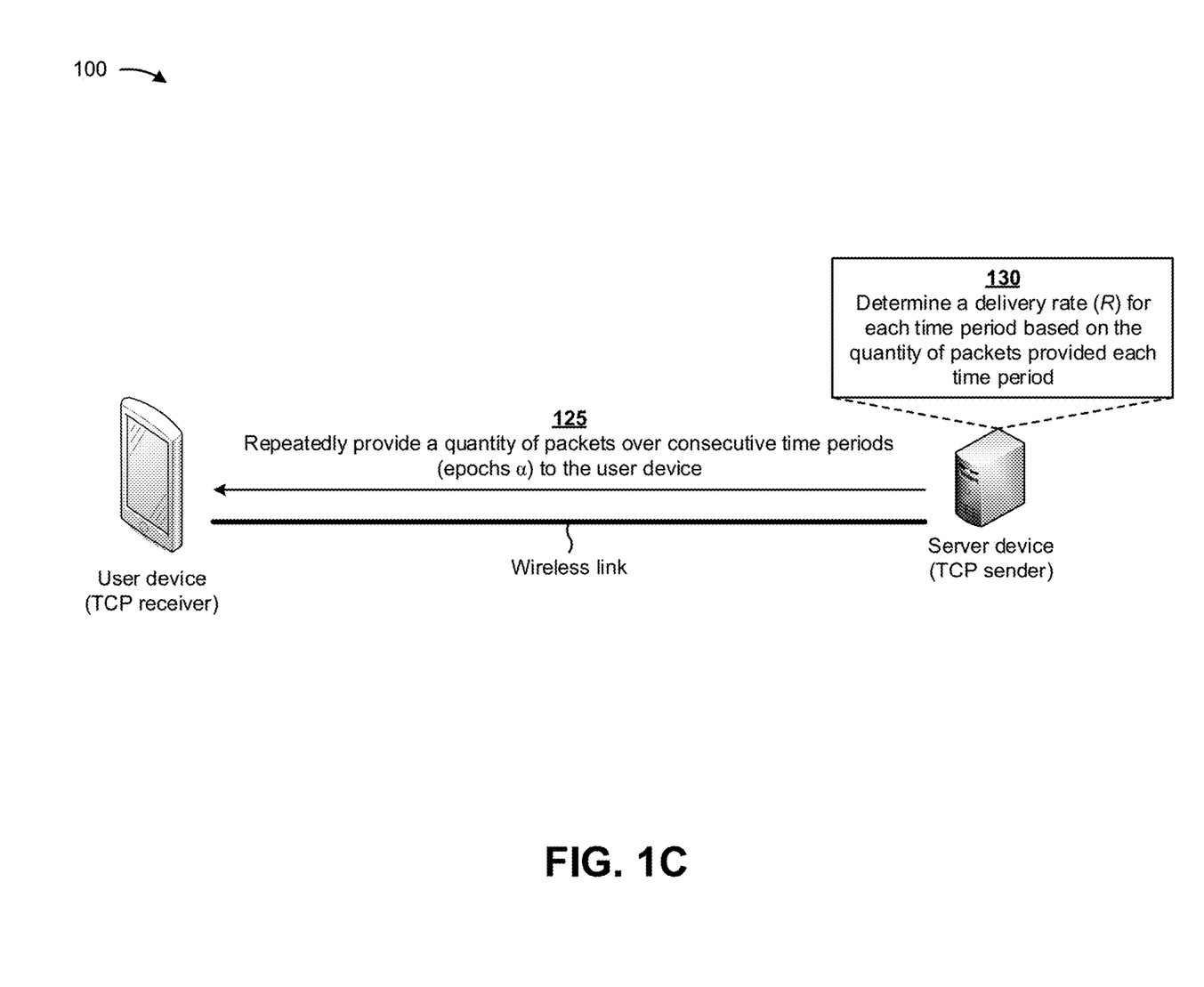

As shown in FIG. 1C, and by reference number 125, when the server device enters the slow start state, the server device can repeatedly provide a quantity of packets over consecutive time periods (epochs a) to the user device (e.g., via the wireless link). In some implementations, in order to measure a maximum delivery rate ($R_{max}$) of the wireless link, the server device (e.g., the TCP sender) can track a delivery rate (R) of the quantity of packets for each time period (e.g., epoch or α) after the wireless link is established. In some implementations, a delivery rate ($R_i$) can indicate a quantity of packets delivered in an $i_{th}$ epoch ($α_i$).

Figure 1D:
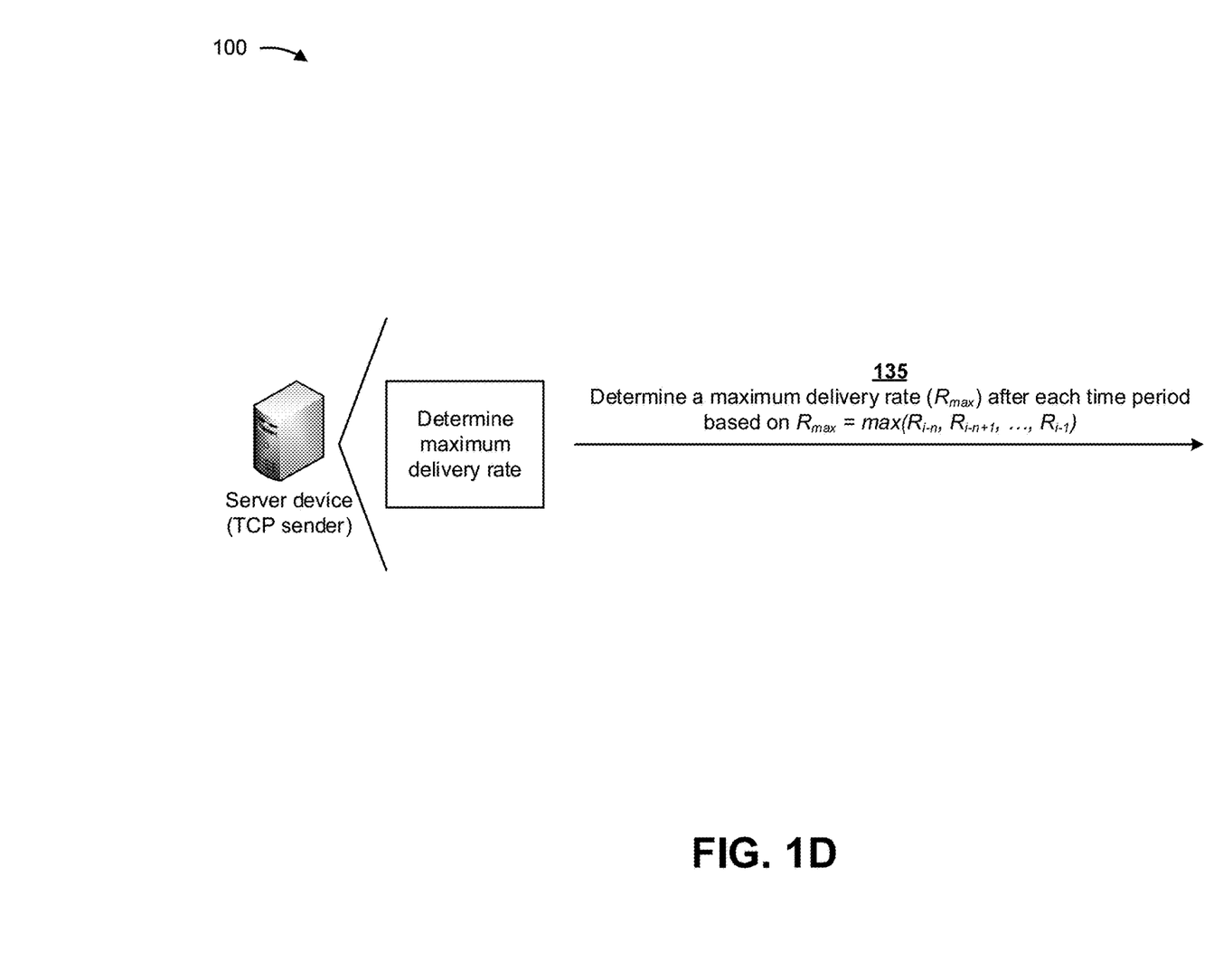

As shown in FIG. 1D, and by reference number 135, the server device can determine a maximum delivery rate ($R_{max}$) for the wireless link after each time period (e.g., epochs 1 through i) as follows:

$$R_{max} = \max(R_{i-n}, R_{i-n+1}, \ldots, R_{i-1}),$$

Where $R_{i-n}$ can correspond to a delivery rate at a first time period (e.g., epoch i-n), $R_{i-n+1}$ can correspond to a delivery rate at a second time period (e.g., epoch i-n+1), and/or the like. In some implementations, the server device can determine the maximum delivery rate for the wireless link after each time period in order to reduce a quantity of delivery rate ($R_i$) values that are stored by the server device.

Figure 1E:
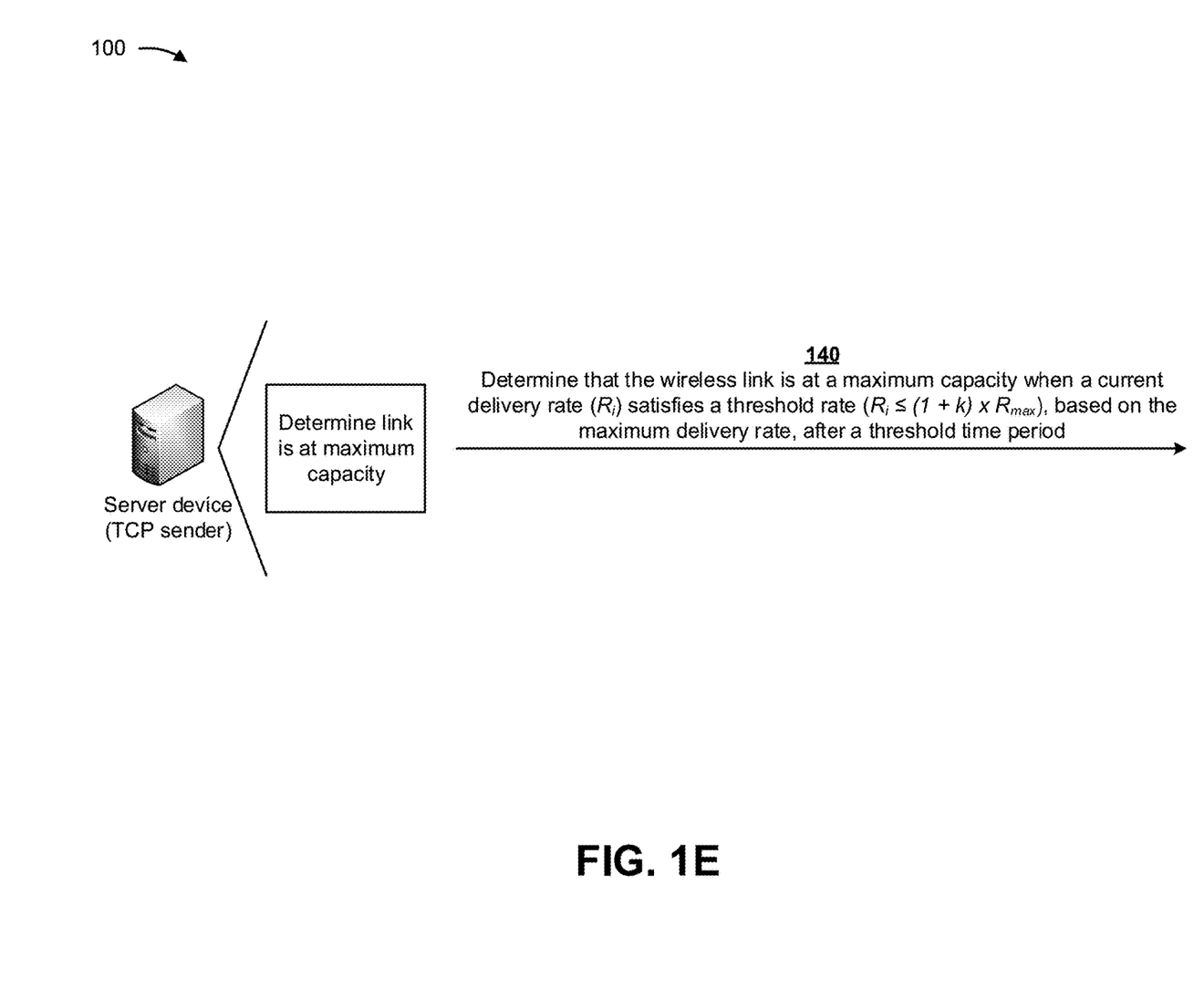

As shown in FIG. 1E, and by reference number 140, the server device can determine that the wireless link is at a maximum capacity when a current delivery rate ($R_i$) satisfies a threshold rate, based on the maximum delivery rate, after a threshold time period. In some implementations, the threshold rate can be based on a safe factor (k) and the maximum delivery rate ($R_{max}$) as follows:

$$(1+k) \times R_{max}.$$

In some implementations, the safe factor can include a default value (e.g., 0.25, 0.3, 0.35, and/or the like). In some implementations, if the server device determines that the wireless link reaches the maximum capacity after one epoch (e.g., a single measurement), the single measurement can be insufficient for the server device to determine that the wireless link is truly at the maximum capacity. Therefore, the threshold time period is utilized by the server device to ensure that the wireless link is truly at the maximum capacity. In some implementations, the threshold time period can reduce effects of random measurement error and can include a default quantity of epochs (e.g., three epochs, four epochs, five epochs, etc.).

In some implementations, at a delivery rate ($R_i$) for an $i_{th}$ epoch, the server device can determine the wireless link to be at the maximum capacity when $R_i \leq (1+k) \times R_{max}$. In some implementations, since a congestion window size for the wireless link can be doubled every round-trip time, the delivery rate for the wireless link can be doubled every round-trip time if the round-trip time does not change much. Therefore, in slow start state, if an increase of the delivery rate ($R_i$) is reduced to less than being doubled, the server device can determine the wireless link to be at the maximum capacity.

Figure 1F:
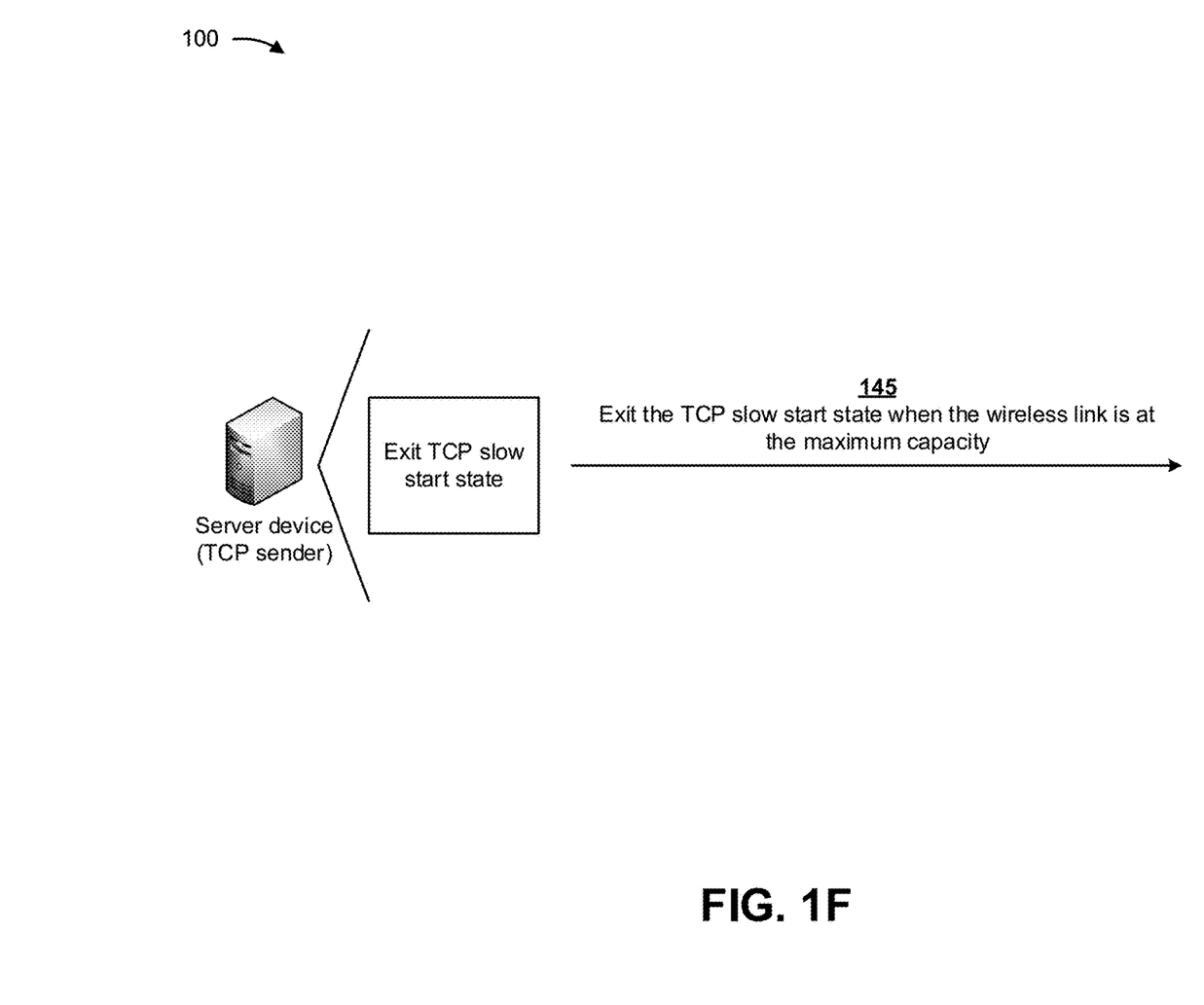

As shown in FIG. 1F, and by reference number 145, the server device can exit the TCP slow start state when the wireless link is at the maximum capacity. In some implementations, when the server device exits the TCP slow start state, the server device can utilize the maximum delivery rate ($R_{max}$) as a maximum measured available bandwidth for the wireless link. In some implementations, the server device can utilize the maximum delivery rate ($R_{max}$) to calculate an optimal congestion window size for the wireless link, as described below.

In some implementations, the server device can remain exited from the TCP slow start state until a TCP flow associated with the server device indicates that the server device should re-enter the slow start state. For example, if the server device receives a retransmission time out, the server device can re-enter the slow start state and can perform the functions described above in connection with FIGS. 1B-1F.

Figure 1G:
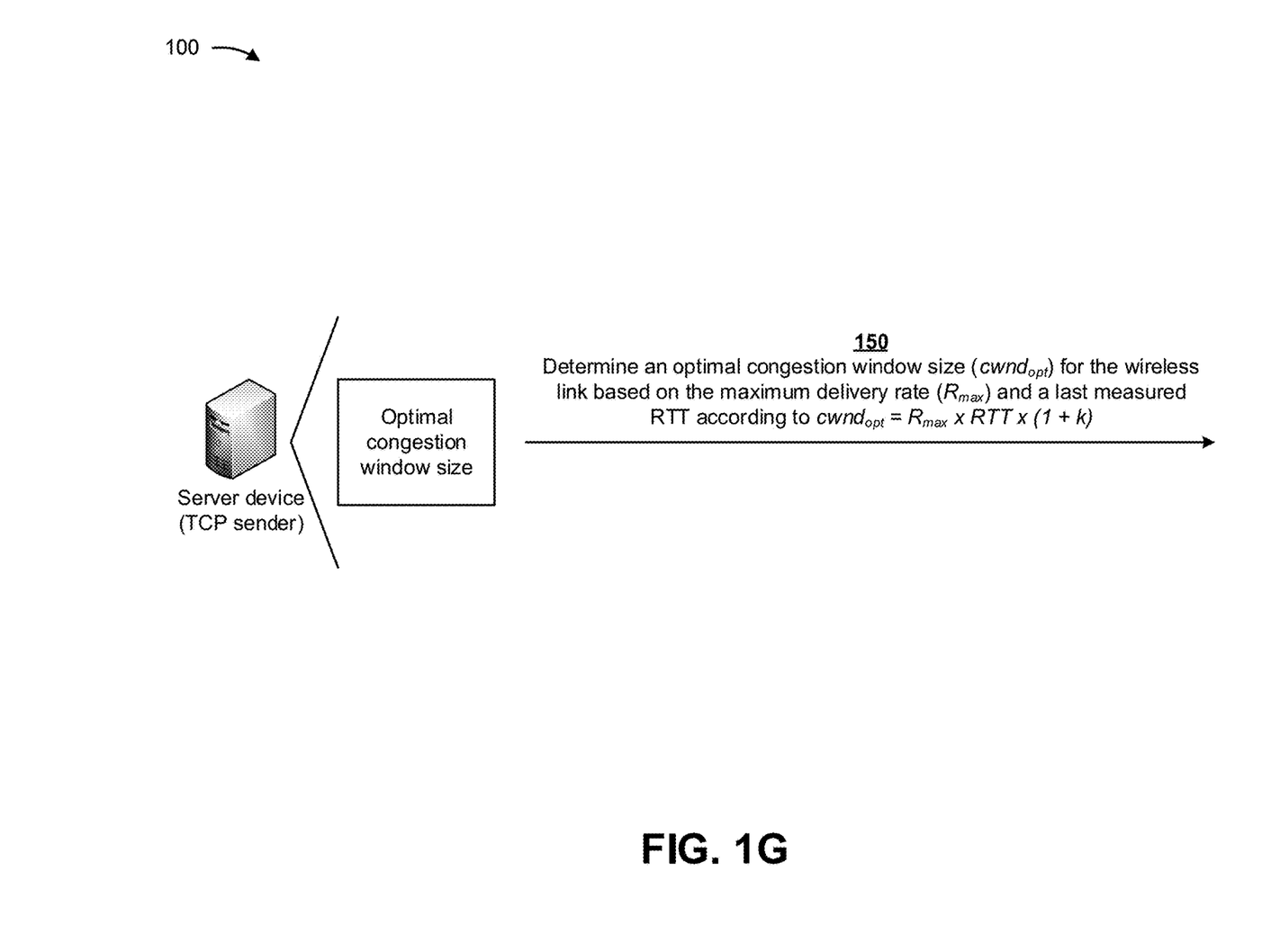

As shown in FIG. 1G, and by reference number 150, the server device can determine an optimal congestion window size ($cwnd_{opt}$) for the wireless link based on the maximum delivery rate ($R_{max}$), a last measured round-trip time (RTT), and the safe factor (k). In some implementations, the server device can determine the optimal congestion window size ($cwnd_{opt}$) for the wireless link as follows:

$$cwnd_{opt} = R_{max} \times RTT \times (1+k).$$

In some implementations, after the server device exits the slow start state, the server device can enter a steady state. In the steady state, since the server device determined the maximum delivery rate ($R_{max}$) during the slow start state, the server device can utilize the determined maximum delivery rate and the equation above to calculate the optimal congestion window size. Since the RTT measurement can contain noise, the safe factor (k) can be utilized in the equation to prevent negative effects of underestimation of the RTT. In some implementations, the server device can utilize the last measured RTT, a smoothed RTT (SRTT), an initial RTT measured during the TCP three-way handshake, and/or the like, when calculating the optimal congestion window size.

Figure 1H:
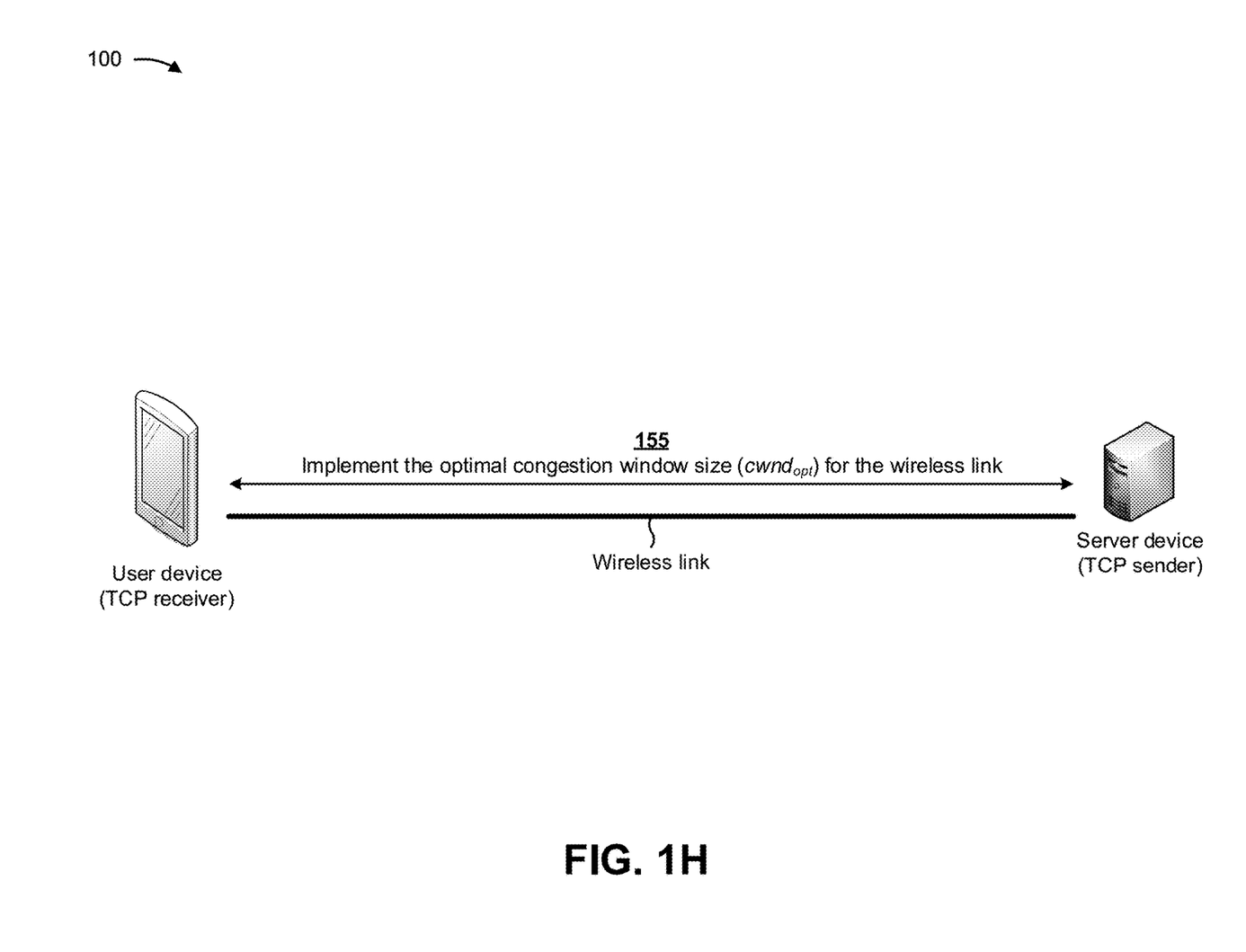

As shown in FIG. 1H, and by reference number 155, the server device can implement the optimal congestion window size for the wireless link. In some implementations, the optimal congestion window size is maintained by the server device and can include a factor that determines a number of bytes that can be provided on the wireless link at any time. The optimal congestion window size can provide a mechanism for preventing the wireless link between the server device and the user device from becoming overloaded with too much traffic.

In this way, several different stages of the process for providing passive bandwidth estimation of a wireless link in a transmission control protocol (TCP) slow start state are improved over existing slow start techniques, which conserves computing resources (e.g., processing resources, memory resources, and/or the like) that would otherwise be wasted in attempting to balance a speed of a wireless link, detect a maximum available bandwidth for the wireless link, and/or estimate link capacity for the wireless link at current network conditions. Furthermore, implementations described herein use a rigorous, computerized process to perform tasks or roles that were not previously performed or were previously performed using subjective human intuition or input. For example, currently there does not exist a technique that provides passive bandwidth estimation of a wireless link in a transmission control protocol (TCP) slow start state. Finally, implementations described herein provide a technique that does not erroneously consider wireless link loss as a congestion signal.

As indicated above, FIGS. 1A-1H are provided merely as examples. Other examples can differ from what is described with regard to FIGS. 1A-1H. The number and arrangement of devices and networks shown in FIGS. 1A-1H are provided as an example. In practice, there can be additional devices and/or networks, fewer devices and/or networks, different devices and/or networks, or differently arranged devices and/or networks than those shown in FIGS. 1A-1H. Furthermore, two or more devices shown in FIGS. 1A-1H can be implemented within a single device, or a single device shown in FIGS. 1A-1H can be implemented as multiple, distributed devices. Additionally, or alternatively, a set of devices (e.g., one or more devices) of FIGS. 1A-1H can perform one or more functions described as being performed by another set of devices of FIGS. 1A-1H.

Figure 2:
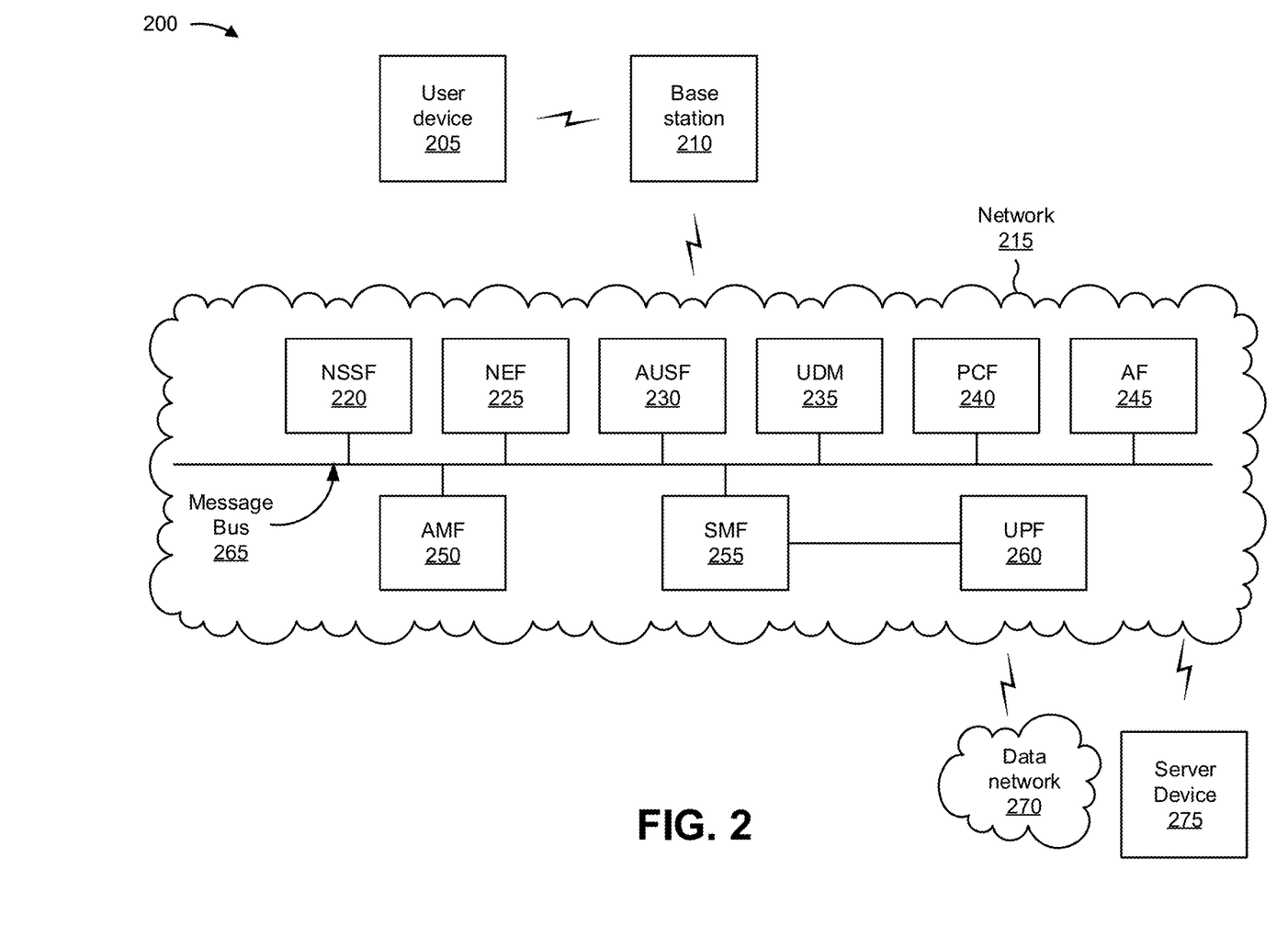
FIG. 2 is a diagram of an example environment in which systems and/or methods described herein can be implemented.

FIG. 2 is a diagram of an example environment 200 in which systems and/or methods described herein can be implemented. As shown in FIG. 2, example environment 200 can include a user device 205, a base station 210, a network 215, a data network 270, and a server device 275. Devices and/or networks of example environment 200 can interconnect via wired connections, wireless connections, or a combination of wired and wireless connections.

User device 205 includes one or more devices capable of receiving, generating, storing, processing, and/or providing information, such as information described herein. For example, user device 205 can include a mobile phone (e.g., a smart phone, a radiotelephone, etc.), a laptop computer, a tablet computer, a desktop computer, a handheld computer, a gaming device, a wearable communication device (e.g., a smart watch, a pair of smart glasses, etc.), a mobile hotspot device, a fixed wireless access device, customer premises equipment, an autonomous vehicle, or a similar type of device. In some implementations, user device 205 can receive information from and/or transmit information to base station 210.

Base station 210 includes one or more devices capable of communicating with user device 205 using a cellular radio access technology (RAT). For example, base station 210 can include a base transceiver station, a radio base station, a node B, an eNodeB (eNB), a gNodeB (gNB), a base station subsystem, a cellular site, a cellular tower (e.g., a cell phone tower, a mobile phone tower, and/or the like), an access point, a transmit receive point (TRP), a radio access node, a macrocell base station, a microcell base station, a picocell base station, a femtocell base station, or a similar type of device. Base station 210 can transfer traffic between user device 205 (e.g., using a cellular RAT), other base stations 210 (e.g., using a wireless interface or a backhaul interface, such as a wired backhaul interface), and/or network 215. Base station 210 can provide one or more cells that cover geographic areas. Some base stations 210 can be mobile base stations. Some base stations 210 can communicate using multiple RATs.

In some implementations, base station 210 can perform scheduling and/or resource management for user devices 205 covered by base station 210 (e.g., user devices 205 covered by a cell provided by base station 210). In some implementations, base station 210 can be controlled or coordinated by a network controller, which can perform load balancing, network-level configuration, and/or the like. The network controller can communicate with base station 210 via a wireless or wireline backhaul. In some implementations, base station 210 can include a network controller, a self-organizing network (SON) module or component, or a similar module or component. In other words, base station 210 can perform network control, scheduling, and/or network management functions (e.g., for other base stations 210 and/or for uplink, downlink, and/or sidelink communications of user devices 205 covered by the base station 210). In some implementations, base station 210 can include a central unit and multiple distributed units. The central unit can coordinate access control and communication with regard to the multiple distributed units. The multiple distributed units can provide user devices 205 and/or other base stations 210 with access to data network 270 via the core network.

In some implementations, network 215 can include an example functional architecture in which systems and/or methods described herein can be implemented. For example, network 215 can include an example architecture of a fifth generation (5G) next generation (NG) core network included in a 5G wireless telecommunications system. While the example architecture of network 215 shown in FIG. 2 can be an example of a 5G network, in some implementations, network 215 can be implemented as a third generation (3G) network, a fourth generation (4G) or long-term evolution (LTE) network, and/or the like.

As shown in FIG. 2, network 215 can include a number of functional elements. The functional elements can include, for example, a network slice selection function (NSSF) 220, a network exposure function (NEF) 225, an authentication server function (AUSF) 230, a unified data management (UDM) component 235, a policy control function (PCF) 240, an application function (AF) 245, an access and mobility management function (AMF) 250, a session management function (SMF) 255, a user plane function (UPF) 260, and/or the like. These functional elements can be communicatively connected via a message bus 265. Each of the functional elements shown in FIG. 2 is implemented on one or more devices associated with a wireless telecommunications system. In some implementations, one or more of the functional elements can be implemented on physical devices, such as an access point, a base station, a gateway, and/or the like. In some implementations, one or more of the functional elements can be implemented on a computing device of a cloud computing environment.

NSSF 220 includes one or more devices that select network slice instances for user device 205. By providing network slicing, NSSF 220 allows an operator to deploy multiple substantially independent end-to-end networks potentially with the same infrastructure. In some implementations, each slice can be customized for different services.

NEF 225 includes one or more devices that support exposure of capabilities and/or events in the wireless telecommunications system to help other entities in the wireless telecommunications system discover network services.

AUSF 230 includes one or more devices that act as an authentication server and support the process of authenticating user devices 205 in the wireless telecommunications system.

UDM 235 includes one or more devices that store subscriber data and profiles in the wireless telecommunications system. UDM 235 can be used for fixed access, mobile access, and/or the like, in network 215.

PCF 240 includes one or more devices that provide a policy framework that incorporates network slicing, roaming, packet processing, mobility management, and/or the like.

AF 245 includes one or more devices that support application influence on traffic routing, access to NEF 225, policy control, and/or the like.

AMF 250 includes one or more devices that act as a termination point for non-access stratum (NAS) signaling, mobility management, and/or the like.

SMF 255 includes one or more devices that support the establishment, modification, and release of communications sessions in the wireless telecommunications system. For example, SMF 255 can configure traffic steering policies at UPF 260, enforce user device IP address allocation and policies, and/or the like.

UPF 260 includes one or more devices that serve as an anchor point for intraRAT and/or interRAT mobility. UPF 260 can apply rules to packets, such as rules pertaining to packet routing, traffic reporting, handling user plane QoS, and/or the like.

Message bus 265 represents a communication structure for communication among the functional elements. In other words, message bus 265 can permit communication between two or more functional elements.

Data network 270 includes one or more wired and/or wireless data networks. For example, data network 270 can include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

Server device 275 includes one or more devices capable of receiving, generating, storing, processing, and/or providing information, such as information described herein. For example, server device 275 can include a web server device, a streaming server device, an application server device, a group of server devices, or a similar type of device. In some implementations, server device 275 can receive information from and/or transmit information to user device 205, base station 210, and/or network 215.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of example environment 200 can perform one or more functions described as being performed by another set of devices of example environment 200.

Figure 3:
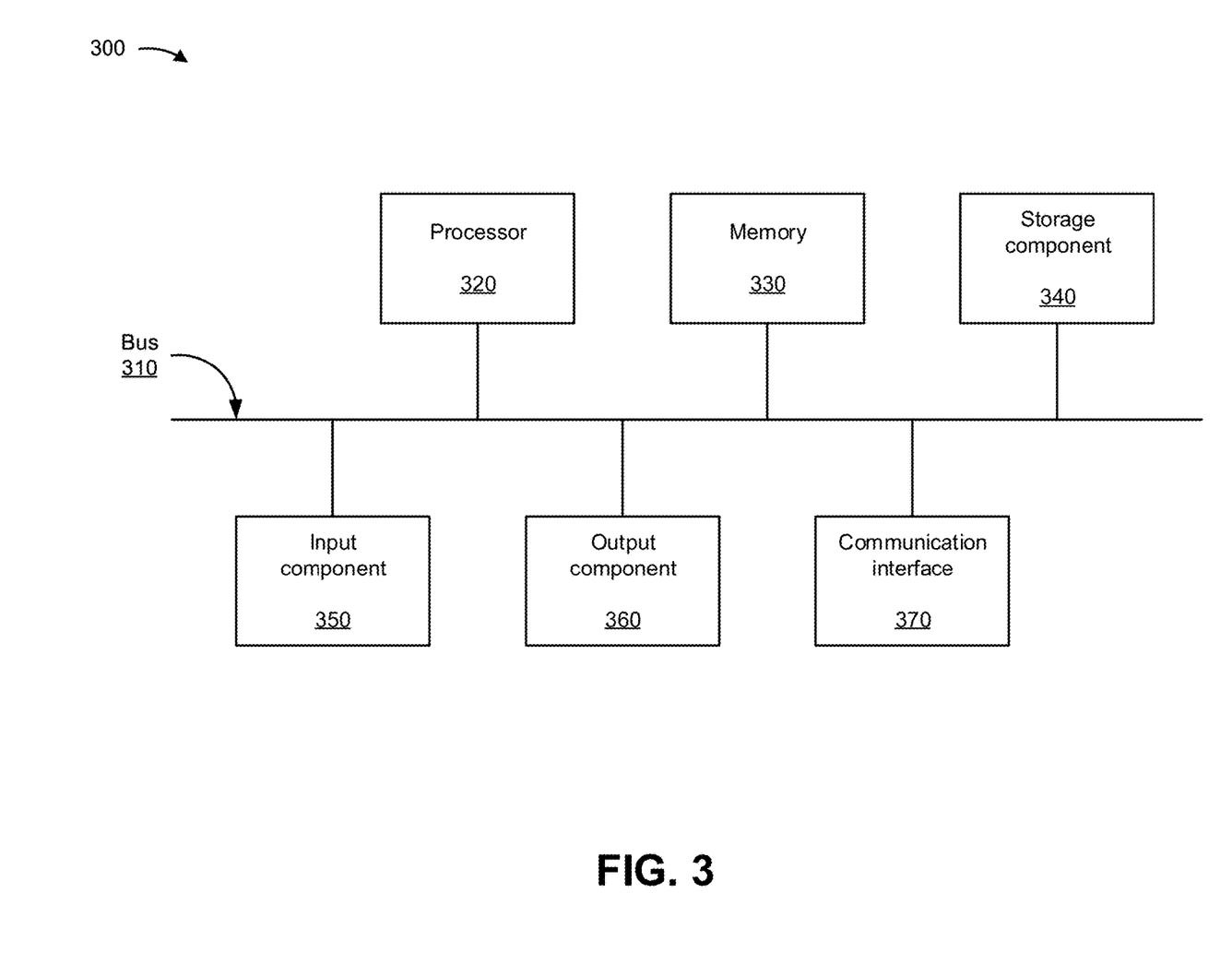
FIG. 3 is a diagram of example components of one or more devices of FIG. 2.

FIG. 3 is a diagram of example components of a device 300. Device 300 can correspond to user device 205, base station 210, NSSF 220, NEF 225, AUSF 230, UDM 235, PCF 240, AF 245, AMF 250, SMF 255, UPF 260, and/or server device 275. In some implementations, user device 205, base station 210, NSSF 220, NEF 225, AUSF 230, UDM 235, PCF 240, AF 245, AMF 250, SMF 255, UPF 260, and/or server device 275 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, and/or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
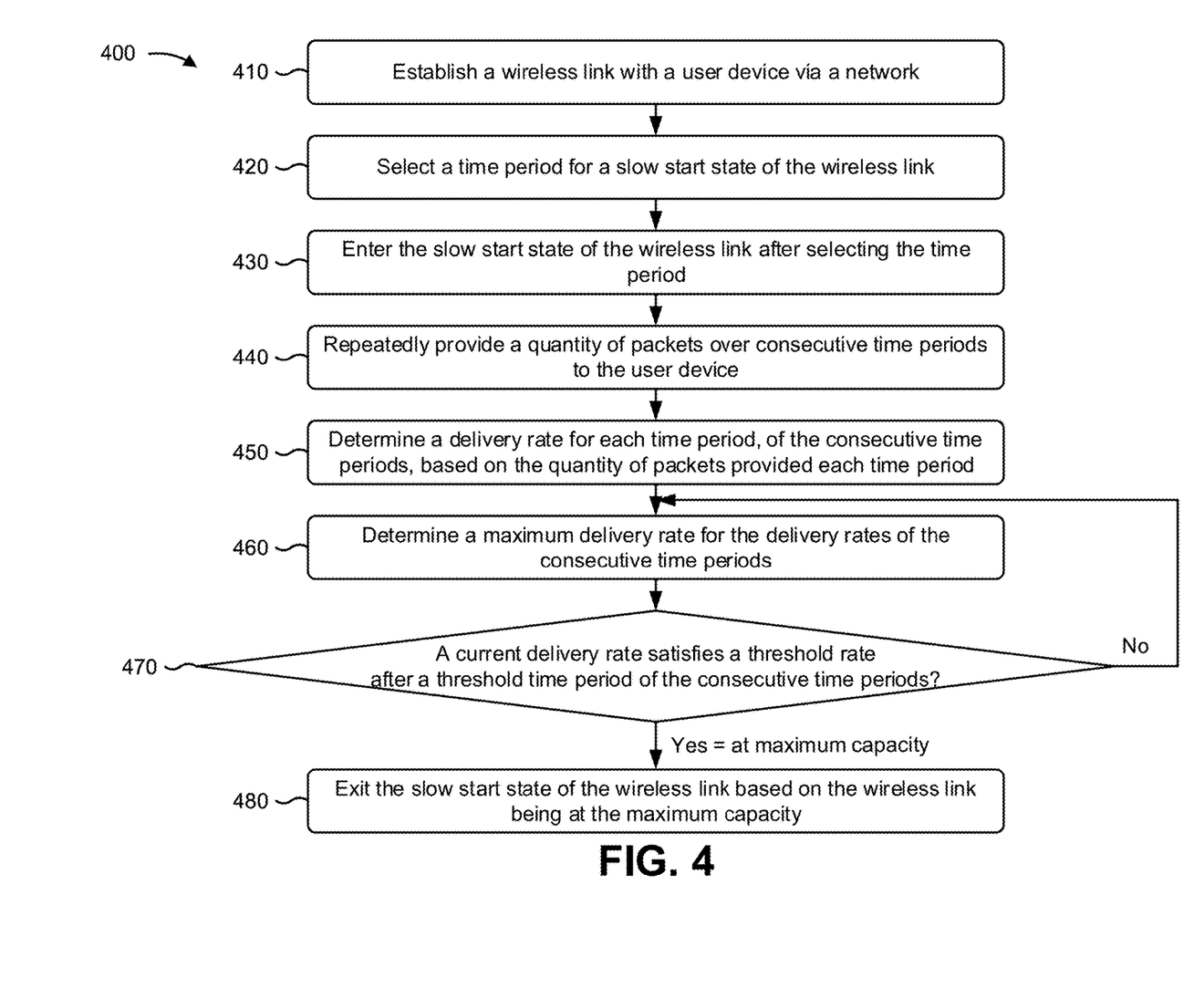
FIG. 4 is a flow chart of an example process for providing passive bandwidth estimation of a wireless link in a transmission control protocol (TCP) slow start state.

FIG. 4 is a flow chart of an example process 400 for providing passive bandwidth estimation of a wireless link in a transmission control protocol (TCP) slow start state. In some implementations, one or more process blocks of FIG. 4 can be performed by a device such as a server device (e.g., server device 275). In some implementations, one or more process blocks of FIG. 4 can be performed by another device or a group of devices separate from or including the device, such as a user device (e.g., user device 205), an NSSF (e.g., NSSF 220), an SMF (e.g., SMF 255), and/or a UPF (e.g., UPF 260).

As shown in FIG. 4, process 400 can include establishing a wireless link with a user device via a network (block 410). For example, the device (e.g., using processor 320, storage component 340, communication interface 370, and/or the like) can establish a wireless link with a user device via a network, as described above in connection with FIGS. 1A-2.

As further shown in FIG. 4, process 400 can include selecting a time period for a slow start state of the wireless link (block 420). For example, the device (e.g., using processor 320, memory 330, communication interface 370, and/or the like) can select a time period for a slow start state of the wireless link, as described above in connection with FIGS. 1A-2.

As further shown in FIG. 4, process 400 can include entering the slow start state of the wireless link after selecting the time period (block 430). For example, the device (e.g., using processor 320, storage component 340, communication interface 370, and/or the like) can enter the slow start state of the wireless link after selecting the time period, as described above in connection with FIGS. 1A-2.

As further shown in FIG. 4, process 400 can include repeatedly providing a quantity of packets over consecutive time periods to the user device (block 440). For example, the device (e.g., using processor 320, memory 330, communication interface 370, and/or the like) can repeatedly provide a quantity of packets over consecutive time periods to the user device, as described above in connection with FIGS. 1A-2.

As further shown in FIG. 4, process 400 can include determining a delivery rate for each time period, of the consecutive time periods, based on the quantity of packets provided during each time period (block 450). For example, the device (e.g., using processor 320, storage component 340, and/or the like) can determine a delivery rate for each time period, of the consecutive time periods, based on the quantity of packets provided during each time period, as described above in connection with FIGS. 1A-2.

As further shown in FIG. 4, process 400 can include determining a maximum delivery rate for the delivery rates of the consecutive time periods (block 460). For example, the device (e.g., using processor 320, memory 330, and/or the like) can determine a maximum delivery rate for the delivery rates of the consecutive time periods, as described above in connection with FIGS. 1A-2.

As further shown in FIG. 4, process 400 can include determining that the wireless link is at a maximum capacity when a current delivery rate satisfies a threshold rate, based on the maximum delivery rate, after a threshold time period of the consecutive time periods (block 470). For example, the device (e.g., using processor 320, storage component 340, and/or the like) can determine that the wireless link is at a maximum capacity when a current delivery rate satisfies a threshold rate, based on the maximum delivery rate, after a threshold time period of the consecutive time periods, as described above in connection with FIGS. 1A-2.

As further shown in FIG. 4, process 400 can include exiting the slow start state of the wireless link based on the wireless link being at the maximum capacity (block 480). For example, the device (e.g., using processor 320, memory 330, storage component 340, communication interface 370, and/or the like) can exit the slow start state of the wireless link based on the wireless link being at the maximum capacity, as described above in connection with FIGS. 1A-2.

Process 400 can include additional implementations, such as any single implementation or any combination of implementations described below and/or described with regard to any other process described herein.

In some implementations, the device can determine, after exiting the slow start state of the wireless link, an optimal congestion time window for the wireless link based on the maximum delivery rate and a last measured round-trip time (RTT) for the wireless link, and can implement the optimal congestion time window for the wireless link. In some implementations, the optimal congestion time window ($cwnd_{opt}$) can be determined based on the maximum delivery rate the last measured round-trip time (RTT), and a safe factor (k).

In some implementations, when selecting the time period for the slow start state of the wireless link, the device can select, as the time period for the slow start state, one of an initial round-trip time (RTT) during a handshake with the user device, a minimum RTT during a flow life cycle with the user device, or a predetermined smoothed RTT. In some implementations, the slow start state can include a transmission control protocol (TCP) slow start state that balances a speed of the wireless link.

In some implementations, the threshold rate can be based on a safe factor (k) and the maximum delivery rate ($R_{max}$) as follows: $(1+k) \times R_{max}$. In some implementations, the device can receive a transmission time out from the wireless link, can select another time period for another slow start state of the wireless link based on receiving the transmission time out, and can enter the slow start state of the wireless link based on selecting the other time period.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

The foregoing disclosure provides illustration and description, but is not intended to be exhaustive or to limit the implementations to the precise form disclosed. Modifications and variations can be made in light of the above disclosure or can be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features can be combined in ways not specifically recited in the claims and/or disclosed in the specification. Although each dependent claim listed below can directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   establishing, by a device, a wireless link with a user device via a network;
   selecting, by the device, a time period for a slow start state of the wireless link;
   entering, by the device, the slow start state of the wireless link after selecting the time period;
   repeatedly providing, by the device, a quantity of packets over consecutive time periods to the user device,
      wherein each consecutive time period, of the consecutive time periods, is equal in duration to the selected time period for the slow start state of the wireless link and based on a round-trip time (RTT) associated with the user device;
   determining, by the device, a delivery rate for each time period, of the consecutive time periods, based on the quantity of packets provided each time period,
      wherein the delivery rate indicates the quantity of packets delivered from the device to the user device for each time period;
   determining, by the device, a maximum delivery rate for the delivery rates of the consecutive time periods after each time period,
      wherein the maximum delivery rate is for the wireless link, and
      wherein the maximum delivery rate is determined based on delivery rates for previous time periods;
   determining, by the device, that the wireless link is at a maximum capacity when a current delivery rate satisfies a threshold rate, based on the maximum delivery rate, after a threshold time period that indicates a quantity of the consecutive time periods,
      wherein the threshold rate is based on a safe factor (k) and the maximum delivery rate; and
   exiting, by the device, the slow start state of the wireless link based on the wireless link being at the maximum capacity;
   determining, after exiting the slow start state of the wireless link, an optimal congestion time window for the wireless link based on the maximum delivery rate and a last measured RTT for the wireless link; and
   implementing the optimal congestion time window for the wireless link.

2. The method of claim 1, wherein the optimal congestion time window ($cwnd_{opt}$) is determined based on the maximum delivery rate ($R_{max}$), the last measured ($RTT_L$), and another safe factor ($k_2$).

3. The method of claim 1, wherein selecting the time period for the slow start state of the wireless link comprises:
   selecting, as the time period for the slow start state, one of:
      an initial RTT during a handshake with the user device,
      a minimum RTT during a flow life cycle with the user device, or
      a predetermined smoothed RTT.

4. The method of claim 1, wherein the slow start state includes a transmission control protocol (TCP) slow start state that balances a speed of the wireless link.

5. The method of claim 1, wherein the threshold rate is based on the safe factor (k) and the maximum delivery rate ($R_{max}$) as follows:

$$(1+k) \times R_{max}.$$

6. The method of claim 1, further comprising:
   receiving a transmission time out from the wireless link;
   selecting another time period for another slow start state of the wireless link based on receiving the transmission time out; and entering the slow start state of the wireless link based on selecting the other time period.

7. The method of claim 1, wherein the maximum delivery rate is determined based on delivery rates for previous time periods including a first time period ($R_{i-n}$) and a second time period ($R_{i-n+}$) as follows:

$$R_{max}=\max(R_{i-n}, R_{i-n+1}, \ldots, R_{i-1}),$$

wherein $R_{max}$ is the maximum delivery rate.

8. A device, comprising:
one or more memories; and
one or more processors to:
  establish a wireless link with a user device via a network;
  select a time period for a slow start state of the wireless link;
  enter the slow start state of the wireless link after selecting the time period;
  repeatedly provide a quantity of packets over consecutive time periods to the user device,
    wherein each consecutive time period, of the consecutive time periods, is equal in duration to the selected time period for the slow start state of the wireless link and based on a round-trip time (RTT) associated with the user device;
  determine a delivery rate for each time period, of the consecutive time periods, based on the quantity of packets provided each time period,
    wherein the delivery rate indicates the quantity of packets delivered from the device to the user device for each time period;
  determine a maximum delivery rate for the delivery rates of the consecutive time periods after each time period,
    wherein the maximum delivery rate is for the wireless link, and
    wherein the maximum delivery rate is determined based on delivery rates for previous time periods;
  determine that the wireless link is at a maximum capacity when a current delivery rate satisfies a threshold rate, based on the maximum delivery rate, after a threshold time period that indicates a quantity of the consecutive time periods,
    wherein the threshold rate is based on a safe factor (k) and the maximum delivery rate;
  exit the slow start state of the wireless link based on the wireless link being at the maximum capacity;
  determine, after exiting the slow start state of the wireless link, an optimal congestion time window for the wireless link based on the maximum delivery rate and a last measured RTT for the wireless link; and
  implement the optimal congestion time window for the wireless link.

9. The device of claim 8, wherein the optimal congestion time window ($cwnd_{opt}$) is determined based on the maximum delivery rate ($R_{max}$), the last measured RTT ($RTT_l$), and another safe factor ($k_2$).

10. The device of claim 8, wherein, when selecting the time period for the slow start state of the wireless link, the one or more processors are to:
  select, as the time period for the slow start state, one of:
    an initial RTT during a handshake with the user device,
    a minimum RTT during a flow life cycle with the user device, or
    a predetermined smoothed RTT.

11. The device of claim 8, wherein the slow start state includes a transmission control protocol (TCP) slow start state that balances a speed of the wireless link.

12. The device of claim 8, wherein the threshold rate is based on the safe factor (k) and the maximum delivery rate ($R_{max}$) as follows:

$$(1+k) \times R_{max}.$$

13. The device of claim 8, wherein the one or more processors are further configured to:
  receive a transmission time out from the wireless link;
  select another time period for another slow start state of the wireless link based on receiving the transmission time out; and
  enter the slow start state of the wireless link based on selecting the other time period.

14. The device of claim 8, wherein the maximum delivery rate is determined based on delivery rates for previous time periods including a first time period ($R_{i-n}$) and a second time period ($R_{i-n+1}$) as follows:

$$R_{max}=\max(R_{i-n}, R_{i-n+1}, \ldots, R_{i-1}),$$

wherein $R_{max}$ is the maximum delivery rate.

15. A non-transitory computer-readable medium storing instructions, the instructions comprising:
one or more instructions that, when executed by one or more processors of a device, cause the one or more processors to:
  establish a wireless link with a user device via a network;
  select a time period for a slow start state of the wireless link;
  enter the slow start state of the wireless link after selecting the time period;
  repeatedly providing a quantity of packets over consecutive time periods to the user device,
    wherein each consecutive time period, of the consecutive time periods, is equal in duration to the selected time period for the slow start state of the wireless link and based on a round-trip time (RTT) associated with the user device;
  determine a delivery rate for each time period, of the consecutive time periods, based on the quantity of packets provided each time period,
    wherein the delivery rate indicates the quantity of packets delivered from the device to the user device for each time period;
  determine a maximum delivery rate for the delivery rates of the consecutive time periods after each time period,
    wherein the maximum delivery rate is for the wireless link, and
    wherein the maximum delivery rate is determined based on delivery rates for previous time periods;
  determine that the wireless link is at a maximum capacity when a current delivery rate satisfies a threshold rate, based on the maximum delivery rate, after a threshold time period that indicates a quantity of the consecutive time periods,
    wherein the threshold rate is based on a safe factor (k) and the maximum delivery rate;
  exit the slow start state of the wireless link based on the wireless link being at the maximum capacity;
  determine, after exiting the slow start state of the wireless link, an optimal congestion time window for the wireless link based on the maximum delivery rate and a last measured RTT for the wireless link; and
  implement the optimal congestion time window for the wireless link.

16. The non-transitory computer-readable medium of claim 15, wherein the optimal congestion time window ($cwnd_{opt}$) is determined based on the maximum delivery rate ($R_{max}$), the last measured RTT ($RTT_L$), and another safe factor ($k_2$).

17. The non-transitory computer-readable medium of claim 15, wherein the one or more instructions, that cause the one or more processors to select the time period for the slow start state of the wireless link, cause the one or more processors:
   select, as the time period for the slow start state, one of:
      an initial RTT during a handshake with the user device,
      a minimum RTT during a flow life cycle with the user device, or
      a predetermined smoothed RTT.

18. The non-transitory computer-readable medium of claim 15, wherein the slow start state includes a transmission control protocol (TCP) slow start state that balances a speed of the wireless link.

19. The non-transitory computer-readable medium of claim 15, wherein the instructions further comprise:
   one or more instructions that, when executed by the one or more processors, cause the one or more processors to:
      receive a transmission time out from the wireless link;
      select another time period for another slow start state of the wireless link based on receiving the transmission time out; and
      enter the slow start state of the wireless link based on selecting the other time period.

20. The non-transitory computer-readable medium of claim 15, wherein the maximum delivery rate is determined based on delivery rates for previous time periods including a first time period ($R_{i-n}$) and a second time period ($R_{i-n+1}$) as follows:

$$R_{max} = \max(R_{i-n}, R_{i-n+1}, \ldots, R_{i-1}),$$

wherein $R_{max}$ is the maximum delivery rate.

* * * * *